Jan. 26, 1965 W. J. HEIN 3,167,688
BALLAST CASE ASSEMBLY
Filed Nov. 21, 1960 2 Sheets-Sheet 1
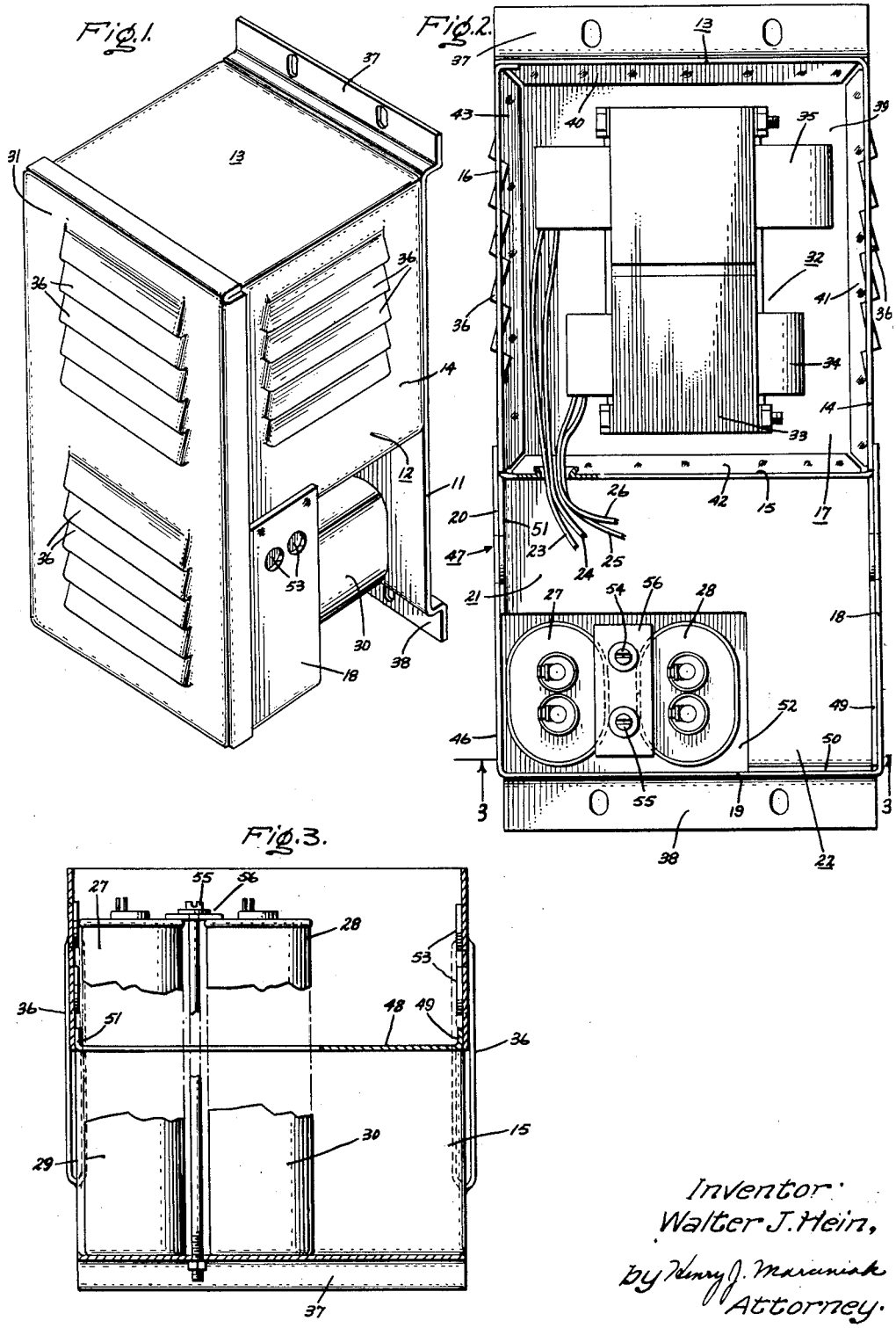
Inventor:
Walter J. Hein,
by Henry J. Maruniak
Attorney.

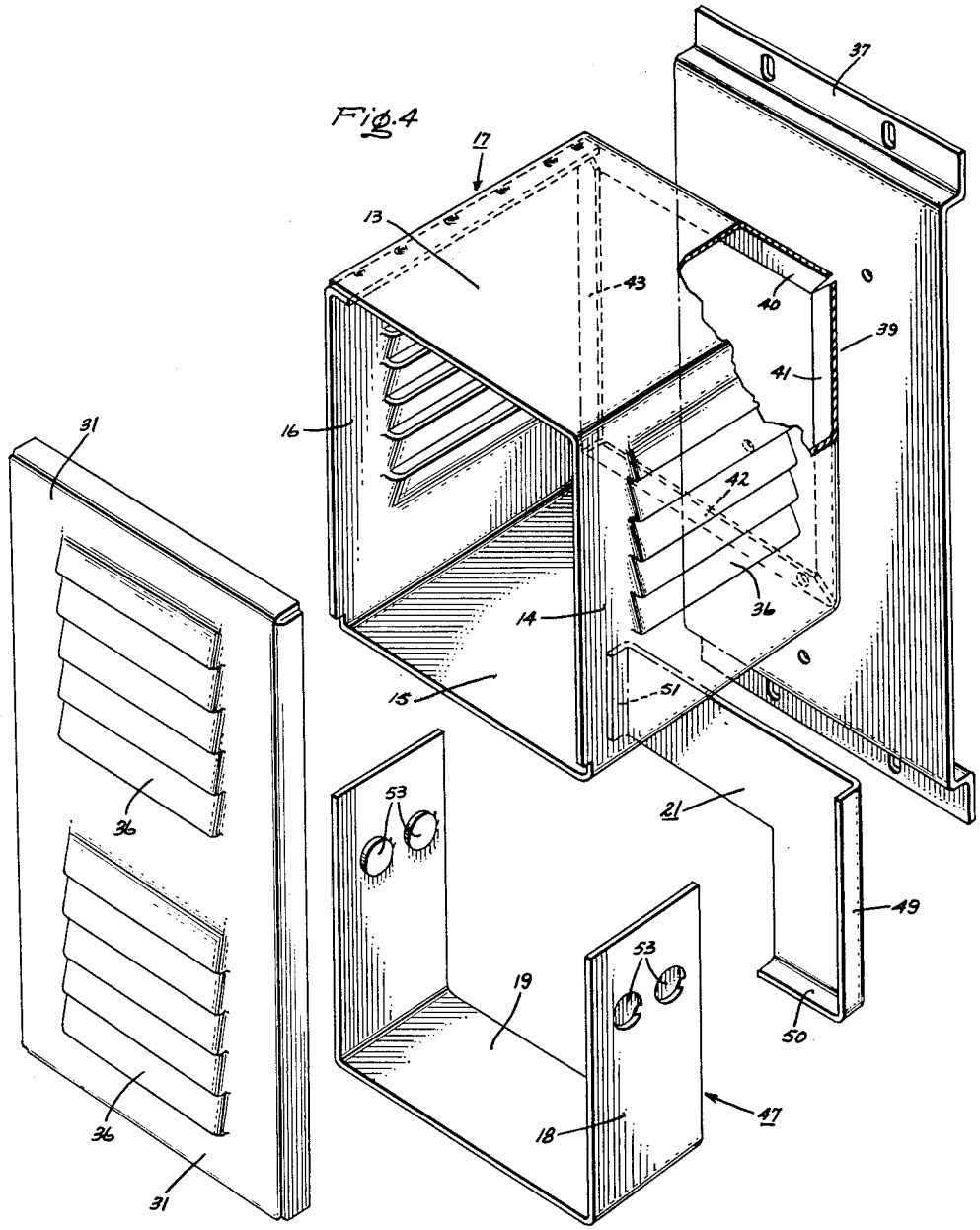

United States Patent Office 3,167,688
Patented Jan. 26, 1965

3,167,688
BALLAST CASE ASSEMBLY
Walter J. Hein, Fort Wayne, Ind., assignor to General Electric Company, a corporation of New York
Filed Nov. 21, 1960, Ser. No. 70,740
4 Claims. (Cl. 317—100)

This invention relates to electrical apparatus and more particularly to a ballast case assembly for housing a ballast apparatus suitable for operation in ambient temperatures as high as 160 degrees Fahrenheit.

A conventional ballast apparatus generally includes a high reactance transformer, one or more capacitors, resistors and circuit connections required to provide proper power transformation and current control for the particular lamp or lamps to be energized. While a high reactance ballast transformer may be operated at fairly high temperatures under certain conditions, the capacitors used in such applications employ liquid dielectrics which readily deteriorate when subjected to excessive heating. For practical reasons, the components of the ballast apparatus are generally provided with a single case or enclosure to protect the windings of the transformer and the other components against damage and to safeguard personnel against electrical shock hazards.

Many difficulties have been encountered in attempting to house or enclose the components of ballast apparatus intended for use at higher than normal temperatures ranging from 150 degrees to 160 degrees Fahrenheit. When a ballast apparatus is operated in a high temperature environment, capacitor overheating poses a serious problem due to the fact that the ballast transformer during its operation evolves an appreciable amount of heat. In the past, case constructions have been suggested wherein the capacitors are thermally isolated from the ballast transformer by transverse insulating partitions interposed between the capacitors and the portion of the case housing the transformer. These case constructions have not proven to be practicable in such high temperature environments.

It is therefore desirable to provide a ballast case assembly whereby the heat transfer from the core and coil of the transformer to the capacitors can be effectively minimized. The case assembly should provide a sturdy enclosure for all of the components and connections in order to protect the components and connections against accidental damage and to provide safety to personnel against electrical shock hazards. Further, such a case assembly should be simple and readily assembled by the manufacturer. The capacitors should be so located with respect to the case assembly so that the capacitors can be readily disconnected and replaced in the event of failure.

Accordingly, a general object of the invention is to provide an improved ballast case assembly incorporating the foregoing features and suitable for operation under high temperature conditions.

Another object of this invention is to provide a ballast case construction wherein provision is made for effectively isolating capacitors from the heat generating components of the ballast apparatus.

It is still another object of this invention to provide an improved arrangement of a ballast case assembly wherein the heat transfer from the core and coil of the ballast transformer to the capacitors is effectively minimized.

In accordance with the invention, an improved case assembly is provided for a ballast apparatus. The case assembly includes an elongated base member, a metallic casing having four side walls extending vertically from said base member thereby forming a main compartment having an opening at the top. The metallic casing also includes three auxiliary side walls and a bottom wall which form a cantilevered compartment for receiving the terminal end portion of at least one capacitor. The cantilevered compartment extends longitudinally from said main compartment, the bottom wall of which is spaced apart from and overlies the base member. An aperture is formed in the bottom wall for receiving the terminal end portion of the capacitor. The cantilevered compartment provides a protective enclosure for the terminal end portion and lead terminals of the ballast apparatus. Sufficient clearance is provided by the aperture so that heat transfer between the metallic case and the terminal end portion is minimized. The capacitor is secured to the base member in a vertically upstanding relationship therewith and is spaced from the main compartment so that any transfer of heat from it to the capacitor is minimized. A cover means is provided for the main compartment, and the cantilevered compartment to provide access to the ballast components.

The subject matter which I regard as my invention is set forth in the appended claims. The invention itself, however, together with further objects and advantages thereof may be understood by referring to the following description taken in connection with the accompanying drawings in which:

FIG. 1 is a perspective view of a ballast case assembly of the present invention;

FIG. 2 shows a plan view of the ballast case assembly with the coverplate removed to show the arrangement of the ballast components in the case assembly;

FIG. 3 shows a sectional view on the line 3—3 of FIG. 2; and,

FIG. 4 is an exploded view in perspective of the improved ballast case assembly of this invention.

Referring now to the drawings, the invention as shown is embodied in a ballast case assembly 10 comprising an elongated base member 11, a metallic casing 12 having four side walls 13, 14, 15, 16 extending vertically of the base member 11 to form a main compartment 17. Further, the metallic casing 12 has three auxiliary side walls 18, 19, 20 and a bottom wall 21 extending longitudinally from the main compartment 17 to form a cantilevered compartment 22 for receiving lead terminals 23, 24, 25 and 26 and terminal end portions 27, 28 of capacitors 29, 30, as is shown in FIG. 2. A cover plate 31 is removably attached to the metallic casing 12 by screws and provides access to the components of the ballast apparatus.

Referring to FIG. 2, it will be seen that with the cover plate 31 removed, an opening is provided in the main compartment 17 and the cantilevered compartment 22 so that a ballast transformer 32 and the leads 23, 24, 25, 26 are readily accessible for connection to capacitors 29, 30 and external connections not shown. The ballast transformer 32 includes a magnetic core 33, a primary coil 34 and a secondary coil 35. Although in the illustrative embodiment of the invention, the side walls 13, 14, 15, 16 of the main compartment 17 and the cover plate 31 have louvers 36 to provide for free circulation of air within the interior of the compartments 17, 22, it will be appreciated that the louvers 36 may be eliminated where the compartment 17 is filled with a suitable potting compound. The transformer 32 in the illustrative embodiment of the invention is air cooled.

Referring now more specifically to FIG. 4, the base member 11 is formed with flanged portions 37, 38 angled so that when the flanged portions 37, 38 are secured to a horizontal mounting surface (not shown), compartment 17 is spaced from the horizontal surface to permit air to freely circulate between the horizontal surface and the bottom side 39 of the main compartment 17. It will be noted that the four side walls 13, 14, 15, 16 of the main compartment 17 are formed integrally from the single piece of sheet metal. The side walls 13, 14, 15, 16 are provided with the flanged portions 40, 41, 42, 43 so that the side walls 13, 14, 15, 16 may be readily secured to the base member 11 by spot welding or some other suitable connecting means. Thus, the base member 17 forms the bottom side 39 of the main compartment 17. When the cover plate 31 is in assembled relation with the main compartment 17, it forms the top side of the case assembly 10. The cover plate 31 is also formed with louvers 36 to allow free circulation of air in the interior of the main compartment 17.

The three auxiliary side walls 18, 19, 20 of the cantilevered compartment 22 may be formed by attaching a U-shaped member 47 to the side walls 14, 16 of the main compartment 17. Thus, the bottom side 21 of the cantilevered compartment 22 has the flanged portions 49, 50, 51 formed thereon so that the bottom side 21 can be conveniently attached, as by spot welding, to the auxiliary side walls 18, 19, 20 of the metallic casing 12. An aperture 52 is provided in the bottom side 21 for terminal end portions 27, 28 of capacitors 29, 30. Preferably, terminal end portions 27, 28 are so disposed in the aperture 52 so as to provide sufficient clearance to prevent any appreciable heat transfer from the metallic casing 12 to capacitors 29, 30. The cantilevered compartment 22 may be provided with convenient knock-outs 53 in order to bring the necessary external electrical leads into the interior of the cantilevered compartment 22 which serves as a wiring box.

In order to hold the capacitors 29, 30 in assembled relation, they are secured by a clamping plate 50 and the through bolts 54, 55 to the base member 11. Thus, the capacitors 29, 30 can be readily removed and replaced by removing the cover plate 31 and the clamping plate 50.

It will now be readily understood that the cantilevered compartment 22 permits the capacitors 29, 30 to be so arranged that they are sufficiently spaced apart from the main compartment so that heat transfer therefrom is effectively minimized. Further, the cantilevered compartment 22 provides a protective enclosure for lead terminals 23, 24, 25, 26 brought out from the main compartment 17, external lead terminals (not shown) for connection to lamps and a power source, and the terminal end portions 27, 28 of capacitors 29, 30. By employing the cantilevered compartment arrangement of the invention, it is possible to mount the capacitors 29, 30 in a vertically upstanding relationship with respect to the base member 11 and thereby reduce the overall length of a case assembly as compared with an arrangement wherein the capacitors are disposed along a longitudinal axis. Further, it will be noted that the capacitors 29, 30 are not rigidly associated with the cantilevered compartment 22 but with the base member 11 to which they are removably secured. The portion of the base member 11 which is disposed between the capacitors 29, 30 and the main compartment is effectively exposed to air so that heat transferred to it from the transformer 32 is effectively dissipated. It was found that when capacitors 29, 30 and transformer 32 were housed in the same case assembly, the capacitor temperature during operation underwent a rise in temperature ranging from 45 to 64 degrees Fahrenheit. With the arrangement of the present invention, it was possible to reduce this temperature rise to a value ranging from 15 to 18 degrees Fahrenheit.

From the exploded view of FIG. 4, it will be seen that the ballast case assembly 10 of the present invention can be readily fabricated. The U-shaped member 47 and bottom side 48, if desired, may be preassembled with the main compartment 17 before it is attached to the base member 11. The main compartment 17 and cantilevered compartment 22 may then be attached to the base member 11 by spot welding the flanged portions 41, 42, 43, 44 thereto. After the components of the ballast apparatus are installed therein, the cover plate 11 may then be installed in place. Although the ballast case shown in the illustrative embodiment is provided with a single cover plate 31, which is secured to the metallic casing 12, separate cover means, if desired, may be used.

From the foregoing description, it should be apparent that a ballast case assembly is provided that can be readily and inexpensively manufactured. The cantilevered compartment arrangement of the invention renders the capacitors substantially independent of the temperature conditions produced by the heat generating components of a ballast apparatus. Further, the arrangement permits capacitors to be mounted in a vertical position with respect to a base member.

It has been found by vertically mounting the capacitors on a base member and using the cantilevered compartment arrangement of the invention, a protective enclosure is provided for the capacitor terminals and lead terminals and the capacitors become substantially independent of temperature conditions produced in the main compartment. Further, the arrangement of the present invention allows sufficient space between the capacitors and the compartment containing heat generating components to permit cooling air to freely circulate between the compartment and the capacitors. By attaching the capacitors to the base member, it was found that the amount of metal available for the conduction of heat from the main compartment to the capacitors is minimized.

Thus, a principal advantage achieved by the case construction of the present invention is that the temperature rise of the capacitors is significantly reduced during the operation of the ballast apparatus. Consequently, the ballast case assembly makes it possible to employ ballast apparatus in applications where the ambient temperature may reach as high as 160 degrees Fahrenheit.

While I have described above a particular embodiment of the invention, many modifications may be made. It will be apparent that many modifications may be made to the parts used to construct the main compartment and the cantilevered compartment. However, it is to be understood that I intend by the appended claims to cover all such modifications as fall within the true spirit and scope of the invention.

What I claim as new and desire to secure from Letters Patent of the United States is:

1. A case assembly for a ballast apparatus including a ballast transformer and at least one capacitor, said case assembly comprising an elongated base member, a metallic casing having four side walls extending vertically of said base member and defining a main compartment for receiving said ballast transformer and having an opening for assembling said ballast transformer therein, said metallic casing having three auxiliary side walls and a bottom wall to form a cantilevered compartment for receiving lead terminals and the terminal end portion of the capacitor, said cantilevered compartment extending longitudinally from said main compartment and having an opening to provide access to the lead terminals, said bottom wall of said cantilevered compartment being spaced apart from and overlying said base member, said bottom wall of said cantilevered compartment having an aperture to receive the terminal end portion of said capacitor thereby providing a protective enclosure for said terminal end portion and lead terminals, said aperture providing sufficient clearance to minimize heat transfer from said casing to said capacitor, and means for covering said openings in said main compartment and said cantilevered compartment, and means for securing the capacitor to said base member in a vertically upstanding relationship therewith and spaced from said main compartment so that heat transfer from said compartment to said capacitor is minimized.

2. A case assembly for a ballast apparatus including a high reactance transformer and a pair of capacitors, said case assembly comprising an elongated base member, a metallic casing having four side walls extending vertically upward of said base member and defining a main compartment for housing at least said high reactance transformer and defining an opening to permit said high reactance transformer to be installed therein, said metallic casing having a cantilevered compartment extending outwardly thereof, spaced apart from and overlying said base member, said cantilevered compartment having an aperture formed therein for receiving the terminal end portion of said capacitors, and means for removably securing said capacitors in a vertically upstanding relationship with said base member and in a spaced apart relationship with said main compartment so that heat transfer between said main compartment and said capacitors is minimized, said cantilevered compartment providing a protective enclosure for the terminal end portion of said capacitors.

3. A case assembly for a ballast apparatus including a transformer and at least one capacitor, said case assembly comprising an elongated base member disposed along a longitudinal axis, a metallic casing having four side walls extending vertically from said base member and defining a main compartment for receiving at least said transformer, said metallic casing including a U-shaped member and a bottom side extending outwardly of said main compartment and in spaced apart and overlying relationship to said base member to define a cantilevered compartment, said bottom side providing an aperture having sufficient clearance to permit the terminal end portion of said capacitor to pass therethrough but spaced from said aperture to minimize heat transfer from said metallic casing to said capacitor, and means for removably securing said capacitors in a vertically upstanding relationship with respect to said base member, said capacitor being sufficiently spaced from said main compartment in order to minimize heat transfer from said main compartment to said capacitors during operation of the ballast apparatus.

4. A case assembly for a ballast apparatus including a high reactance transformer and a pair of capacitors, said case assembly comprising an elongated base member, a metallic casing having four side walls extending vertically of said base member and defining a main compartment having an opening for assembling said ballast transformer therein, said metallic casing having a cantilevered compartment extending outwardly thereof and in spaced apart and overlying relationship with said base member, said cantilevered compartment having an aperture formed therein for receiving the terminal end portion of said capacitors and providing an opening to provide access to the lead terminals of the ballast apparatus, means for securing said capacitors in a vertically upstanding relationship with said base member and in a spaced apart relationship with said main compartment, said cantilevered compartment providing a protective enclosure for the terminal end portion of said capacitors, and means for covering said openings in said main compartment and said cantilevered compartment, said capacitors being spaced from said main compartment so that heat transfer from said main compartment to said capacitors is minimized.

References Cited by the Examiner
UNITED STATES PATENTS

| | | | |
|---|---|---|---|
| 2,065,662 | 12/36 | De Viney | 307—156 |
| 2,237,814 | 4/41 | Foster | 307—156 |
| 2,740,905 | 4/56 | Henderson | 317—99 |
| 2,970,278 | 1/61 | Reaves | 317—156 |

JOHN F. BURNS, *Primary Examiner.*

MILTON O. HIRSHFIELD, *Examiner.*